United States Patent [19]

McAuliffe et al.

[11] 4,352,302

[45] Oct. 5, 1982

[54] CONTROL FOR HYDROSTATIC TRANSMISSION

[75] Inventors: Gerald N. McAuliffe; Richard E. Pearce, both of Lincoln, Nebr.

[73] Assignee: Outboard Marine Corporation, Waukegan, Ill.

[21] Appl. No.: 183,942

[22] Filed: Sep. 4, 1980

[51] Int. Cl.³ .................. G05G 1/14; G05G 5/06; G05G 7/00

[52] U.S. Cl. .............................. 74/474; 74/475; 74/512; 74/529

[58] Field of Search ............... 74/473 R, 474, 475, 74/512, 529

[56] References Cited

U.S. PATENT DOCUMENTS

| | | | |
|---|---|---|---|
| 1,321,615 | 11/1919 | Friddle . | |
| 1,402,131 | 1/1922 | Alspaugh . | |
| 2,195,084 | 3/1940 | Eklund | 267/150 X |
| 2,483,224 | 9/1949 | Narcovich | 74/478 |
| 2,703,496 | 3/1955 | Massarotti | 74/336.5 |
| 3,528,311 | 9/1970 | Fieber | 74/474 X |
| 3,541,878 | 11/1970 | Haffner | 74/474 |
| 3,759,115 | 9/1973 | Dibonaventura | 74/529 X |
| 4,086,823 | 5/1978 | Fatur | 74/474 |
| 4,106,362 | 8/1978 | Hildebrecht | 74/474 |

*Primary Examiner*—Allan D. Herrmann
*Attorney, Agent, or Firm*—Michael, Best & Friedrich

[57] ABSTRACT

Disclosed herein is a control for a hydrostatic transmission, which control includes a control member operatively connected to the transmission for selectively moving the transmission between forward, neutral and reverse positions in response to control member movement, a pivotally movable member, an actuating member mounted for movement between forward, neutral and reverse positions, means connecting the actuating member with the movable member for pivoting the movable member in response to actuating member movement and connecting the actuating member and the control member for moving the transmission between forward, neutral and reverse positions in response to actuating member movement, and first and second arms pivotally mounted coaxially with, and independently of, the movable member and having outer free ends located in spaced relationship to each other. The movable member is engageable with the second arm so as to displace the second arm in a first pivotal direction in response to actuating member movement from the neutral to the forward positions and so as to displace the first arm in the opposite pivotal direction in response to actuating member movement from the neutral to the reverse positions, a spring biasing the arms toward each other, and a stop disposed between the arms for engaging the first arm so as to prevent pivotal movement thereof in the first direction when the second arm is pivoted by the movable member in the first direction and for engaging the second arm so as to prevent pivotal movement thereof in the opposite direction when the first arm is pivoted by the movable member in the second direction.

9 Claims, 3 Drawing Figures

CONTROL FOR HYDROSTATIC TRANSMISSION

BACKGROUND OF THE INVENTION

This invention relates to controls for hydrostatic transmissions.

Vehicle hydrostatic transmissions typically include a hydraulic pump operating a hydraulic motor which drives the vehicle and a combined direction and speed control for selectively controlling the direction of the fluid flow through the motor, and thus direction of vehicle movement, and for controlling the volume of fluid flowing to the motor, and thus vehicle speed. One type of control mechanism is operated by a pivotally mounted foot pedal which can be rocked in opposite directions to both shift the transmission from neutral to either forward or reverse positions and control vehicle speed.

It is desirable for such a control mechanism to include means for insuring that the transmission is returned to the neutral position when the vehicle is stopped and for positively retaining it in a neutral position in order to prevent creeping. The retention means should be capable of releasing upon the application of a relatively low force on a foot pedal in order to prevent sudden vehicle movement after the transmission has been shifted into a operative position.

Representative prior constructions of hydrostatic transmission controls including means for automatically returning transmission to a neutral position are disclosed in Fatur U.S. Pat. No. 4,086,823, issued May 2, 1978, and Haffner U.S. Pat. No. 3,541,878, issued Nov. 24, 1970. Attention is also directed to Massarotti U.S. Pat. No. 2,703,496, issued Mar. 8, 1955.

Representative prior constructions of foot pedal arrangements including retention means are disclosed in Narcovich U.S. Pat. No. 2,483,224, issued Sept. 27, 1949, Alspaugh U.S. Pat. No. 1,402,131, issued Jan. 3, 1922, and Friddle U.S. Pat. No. 1,321,615 issued Nov. 11, 1919.

SUMMARY OF THE INVENTION

The invention provides a control for a hydrostatic transmission having selectable positions for controlling the flow of fluid to achieve forward, reverse and neutral positions and to govern the output speed, which control includes a control member operatively connected to the transmission for selectively moving the transmission between forward, neutral and reverse positions in response to movement of the control member, a pivotally mounted bell crank including generally opposed first and second legs and a third leg intermediate the first and second legs and having an outer end portion, actuating means movably mounted for movement between forward, neutral and reverse positions, means connecting the actuating means with the first leg of the bell crank for pivoting the bell crank in response to movement of the actuation means, and means connecting the control member with the second leg of the bell crank for moving the transmission between forward, neutral and reverse positions in response to pivotal movement of the bell crank.

The control member is urged toward a neutral position by first and second arms having inner ends mounted coaxially with the bell crank for relative pivotal movement and having outer free ends in spaced relationship, with the outer end portion of the bell crank third leg disposed between said arms for engagement therewith, a spring interconnecting the free ends of the arms and biasing them toward each other, and means disposed between the arms at a location corresponding to the neutral position of the bell crank for engaging the first arm and preventing pivotal movement thereof in a first direction, as the second arm is pivoted with the bell crank third leg in the first direction against the force of the spring during movement of the bell crank from the neutral position to the forward position, and for engaging the second arm and preventing pivotal movement of the second arm in a second direction opposite to the first direction, as the first arm is pivoted with the bell crank third leg in the second direction against the force of the spring during movement of the bell crank from the neutral position to the reverse position.

In one embodiment, the actuating means comprises a pedal assembly which is mounted for pivotal movement in opposite directions from a neutral position and which is operably connected to the first leg of the bell crank. Means can be provided for releasably locking the pedal assembly in the neutral position.

The invention also provides a control for the above type hydrostatic transmission including a pedal assembly mounted for pivotal movement in opposite directions from a neutral position and including a foot pedal mounted for pivotal movement between a raised position and a depressed position, means connecting a transmission control member to the pedal assembly for moving the transmission between forward, neutral and reverse positions in response to pivotal movement of the pedal assembly, and means for releasably locking the pedal assembly in the neutral position including a stationary latch, a latch arm on the foot pedal for lockingly engaging said latch, and biasing means for urging the foot pedal latch arm into releasably locking engagement with the latch whereby, in response to the foot pedal being moved from the raised position toward the depressed position, the latch arm is disengaged from the latch to permit the pedal assembly to be pivoted in opposite directions relative to the neutral position and whereby, in response to release of the foot pedal with the pedal assembly is in the neutral position, the biasing means returns the foot pedal to the raised position and urges the latch arm into locking engagement with the latch.

One of the principal features of the invention is the provision of a control for a hydrostatic transmission including a manual control and simple, effective means for automatically returning the transmission to the neutral position when the manual control is released.

Another of the principal features of the invention is the provision of such a control including means for releasably retaining the manual control in the neutral position and for facilitating quick and easy release so as to prevent sudden movement when shifting from neutral to forward or reverse.

A further of the principal features of the invention is the provision of such a control having a pedal assembly which serves as the manual control and includes a foot pedal which is arranged to releasably lock the pedal assembly in the neutral position and which operates to quickly unlock the pedal assembly.

Other features, aspects and advantages of the invention will become readily apparent to those skilled in the art upon reviewing the following description, the drawings and the appended claims.

Figure 1:
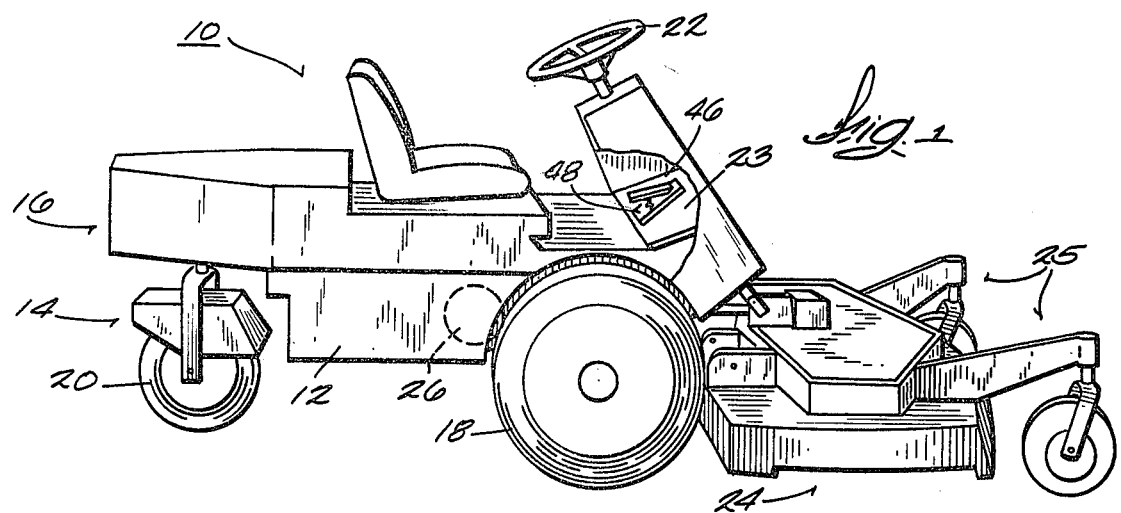
FIG. 1 is a perspective, partially broken away, view of a riding lawn mower including a hydrostatic transmission control incorporating various of the features of the invention.

Before explaining at least one embodiment of the invention in detail, it is to be understood that the invention is not limited in its application to the details of the construction and arrangement of parts set forth in the following general description or illustrated in the accompanying drawings, since the invention is capable of other embodiments and of being practiced or carried out in various ways. Also, it is to be understood that the phraseology and terminology employed herein is for the purpose of description and not of limitation.

GENERAL DESCRIPTION

Illustrated in the drawing is a riding mower 10 including a chassis 12 supported for travel over the ground by a steering unit 14 mounted for rotation about a vertical steering axis on the rear end portion 16 of the chassis 12 and a pair of laterally-spaced front wheels 18 (one shown). The steering unit includes a rear wheel 20 and steering movement is accomplished by a steering wheel 22 operatively connected to the steering unit 14 in a suitable manner. The front end portion of the chassis 16 includes a floor section 23.

Located forwardly of the front wheels 18 is a cutter blade housing 24 which carries a plurality of rotary cutting blades (not shown) and is supported for travel over the ground by a pair of caster wheels 25. The cutter blade housing 24 is suitably mounted on the chassis 12 for pivotal movement between a lowered mowing position and a raised non-mowing position.

The mower 10 is driven by a hydrostatic transmission (not shown) drivingly connected either to the front wheels 18 or to the rear wheel 20 in a suitable manner. The hydrostatic transmission is of conventional design and is controlled by a hydrostatic control unit 26 (illustrated diagrammatically). The hydrostatic control unit 26 includes a rotary control shaft 28 which can be rotated to place the hydrostatic transmission in forward drive, reverse drive or neutral positions. The hydrostatic transmission is arranged in the usual manner such that rotation of the control shaft 28, after the transmission has been shifted from neutral to either the forward or the reverse drive position, increases vehicle speed.

The control shaft 28 is selectively rotated to shift the hydraulic transmission between forward, reverse and neutral positions and to govern vehicle speed by a control arrangement including a bell crank 30 rotatably or pivotally mounted on the vehicle chassis 12. The bell crank 30 has a pair of generally opposed first and second legs 32 and 34 and a third leg 36 intermediate and equally spaced from the first and second legs 32 and 34. The free end of the third leg 36 terminates in an outturned flange or tab 37.

Means are provided for connecting the second leg 34 of the bell crank 30 with the control shaft 28 for rotating the control shaft between forward drive, reverse drive, and neutral positions in response to a pivotal movement of the bell crank 30. In the specific construction illustrated, such means includes a control lever or member 38 connected to the control shaft 28 for common rotation therewith and a link 40 having one end pivotally mounted at 42 on the second leg 34 of the bell crank 30 and the opposite end pivotally mounted at 34 on the control member 38.

Movably mounted on the chassis 12 for movement in opposite directions from a neutral position is a pedal assembly 46 by which the operator can manually actuate the bell crank 30 to control the direction and speed of the mower 10 as explained in more detail below. The pedal assembly 46 includes a pedal support 48 pivotally mounted at 50 on a stationary bracket 52 which is mounted on the floor section 23.

Figure 2:
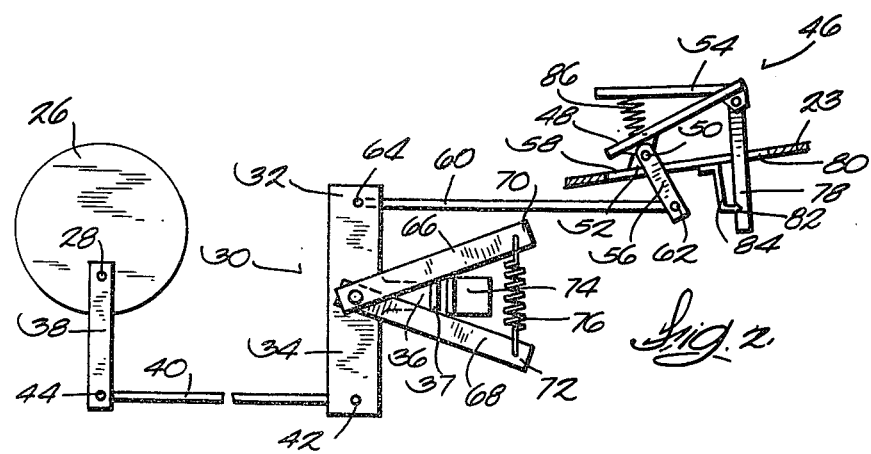
FIG. 2 is an enlarged, partially diagrammatic, side elevation view of the hydrostatic transmission control in the mower of FIG. 1, showing position of various components when the control is in a neutral position.

The pedal support 48 can be pivoted in opposite directions from the neutral positions shown in FIG. 2 by applying pressure on the front end or rear end thereof. The pedal assembly 46 also includes a foot pedal 54 pivotally mounted on the pedal support 48 for pivotal movement between a raised position and a depressed position.

Means are provided for connecting the pedal assembly 46 to the first leg 32 of the bell crank 30 for pivoting the bell crank 30 in response to pivotal movement of the pedal assembly 46. In the specific construction illustrated, such means includes an arm 56 depending from the pedal support 48 and extending downwardly through a slot 58 in the floor section 23 and a link 60 having one end pivotally mounted at 62 on the pedal support arm 56 and the opposite end pivotally mounted at 64 on the first leg 32 of the bell crank 30.

When an operator applies pressure on the front portion of the pedal support 48, it pivots clockwise from the neutral position shown in FIG. 2, causing the bell crank 30 to pivot counterclockwise and move the transmission to the forward drive position via the link 40, the control member 38 and the control shaft 28. Once the transmission has been moved to the forward drive position, further pressure on the front portion of the pedal support 48 increases vehicle speed.

Figure 3:
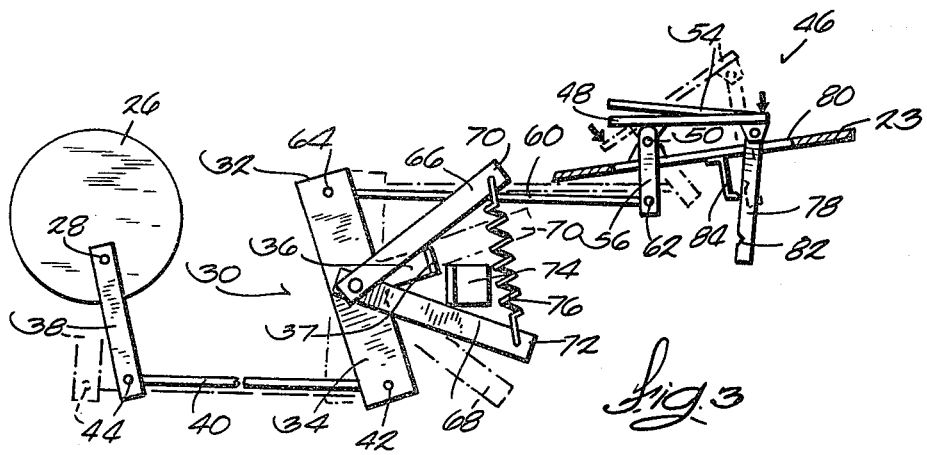
FIG. 3 is a view similar to FIG. 2 showing the position of the various components when the control is in forward and reverse drive positions illustrated by solid and dashed lines, respectively.

When an operator applies pressure on the rear portion of the pedal support 48, it pivots counterclockwise from the neutral position shown in FIG. 2 to the dashed line position shown in FIG. 3, causing the bell crank 30 to pivot clockwise and move the transmission to the reverse drive position. Subsequent application of pressure on the rear portion of the pedal support 48 increases vehicle speed.

Means are provided for automatically returning the transmission to the neutral position when the pedal assembly 46 is released. In the specific construction illustrated, such means includes a pair of arms 66 and 68 having inner ends mounted coaxially with the bell crank 30 for pivotal movement relative to the bell crank 30. The outer or free ends 70 and 72 of the arms 66 and 68 are circumferentially spaced and are disposed on the opposite sides of the tab 37 on the third leg 36 of the bell crank 30 and a stationary stop 74 is mounted on the vehicle chassis 12 at a location corresponding to the neutral position of the bell crank 30. A spring 76 interconnecting the free ends 70 and 72 of the arms 66 and 68 biases the arms towards each other and into engagement with the stationary stop 74 and the bell crank tab 37 when the bell crank 30 is in the neutral position.

When the bell crank 30 is pivoted counterclockwise from the neutral position to move the transmission into the forward position, the arm 66 is pivoted therewith via the tab 37 and the spring 76 is stretched because the pivotal movement of the arm 68 is prevented by the stop 74 as illustrated by the solid lines in FIG. 3. Upon releasing the pedal assembly 46, the spring 76 returns the arm 66 into engagement with the stop 74 and the arm 66, by virtue of its engagement with the bell crank tab 37, pulls the bell crank 30 back to the neutral position. The reverse occurs when the bell crank 30 is pivoted in a clockwise direction from the neutral position to move the transmission to the reverse position.

Means are provided for releasably retaining the pedal assembly 46 in the neutral position in order to prevent creeping when the mower 10 is stopped. In the specific construction illustrated, such means includes a latching arm 78 which extends from the foot pedal 54 and pivots therewith. The latching arm 78 extends through a slot 80 in the floor section 23 and includes a notch 82 for receiving a stationary latch 84 mounted on the underside of the floor section 23. When the pedal assembly 46 is in the neutral position, the latch arm notch 82 is biased into releasable, locking engagement with the stationary latch 84 by a spring 86 which biases the foot pedal 54 toward the raised position as shown in FIG. 2.

The latch arm 78 is released from the latch 84 by the operator pressing down on the foot pedal 54 with a relatively small force against the biasing force of the spring 86, causing the latch arm 78 to pivot away from the latch 84. Subsequent application of pressure on the front of the foot pedal 54 moves the transmission to the forward position and subsequent application of pressure on the rear end of the foot pedal 54 moves the transmission to the reverse position as described above.

When the operator removes his foot from the foot pedal 54, the bell crank 30 is returned to the neutral position by the return spring 76 as described above. As this occurs, the spring 86 returns the foot pedal 54 toward the raised position, causing the latch arm 78 to lockingly engage the latch 84.

The latching mechanism can retain the transmission in a neutral position even though the return spring 76 is inoperative. In that event, the operator can move the pedal assembly 46 to the neutral position by applying pressure on the appropriate end of the foot pedal 54. When the operator removes his foot from the foot pedal 54, the spring 86 returns the foot pedal 54 to the raised position, urges the latch arm 78 into engagement with the latch 84 and retains it in that position until the foot pedal 54 is depressed.

Various of the features of the invention are set forth in the following claims.

We claim:

1. A control for a hydrostatic transmission having selectable positions for controlling the flow of fluid to achieve forward, reverse and neutral positions and to govern the output speed, said control including a control member operatively connected to the transmission for selectively moving the transmission between forward, neutral and reverse positions in response to movement of said control member, a pivotally movable member, actuating means mounted for movement between forward, neutral and reverse positions, means connecting said actuating means with said movable member for pivoting said movable member in response to movement of said actuating means, and connecting said actuating means and said control member for moving the transmission between forward, neutral and reverse positions in response to movement of said actuating means, and means for urging said control member toward the neutral position including first and second arms mounted coaxially with said movable member for independent pivotal movement relative to said movable member and having outer free ends located in spaced relationship to each other, means on said movable member engageable with said second arm so as to displace said second arm in a first pivotal direction in response to movement of said actuating means from the neutral to the forward positions and so as to displace said first arm in a second pivotal direction opposite to said first pivotal direction in response to movement of said actuating means from the neutral position to the reverse position, spring means biasing said arms toward each other, and means disposed between said arms for engaging said first arm so as to prevent pivotal movement of said first arm in the first direction when said second arm is pivoted by said movable member in the first direction against the biasing force of said spring means, and for engaging said second arm so as to prevent pivotal movement of said second arm in the second direction when said first arm is pivoted by said movable member in the second direction against the biasing force of said spring means.

2. A control for a hydrostatic transmission having selectable positions for controlling the flow of fluid to achieve forward, reverse and neutral positions and to govern the output speed, said control including a control member operatively connected to the transmission for selectively moving the transmission between forward, neutral and reverse positions in response to movement of said control member, a pivotally mounted member including a control leg having an outer end portion, actuating means movable mounted for movement between forward, neutral and reverse positions, means connecting said actuating means with said movable member for pivoting said movable member in response to movement of said actuating means, and connecting said actuating means with said control member for moving the transmission between forward, neutral and reverse positions in response to movement of said actuating means, and means for urging said control member toward the neutral position including first and second arms having inner ends mounted coaxially with said movable member for independent pivotal movement relative to said movable member, having outer free ends located in spaced relationship to each other, and with said outer end portion of said control leg disposed between said arms for engagement therewith, spring means biasing said arms toward each other, and means stationarily disposed between said arms for engaging said first arm so as to prevent pivotal movement of said first arm in a first direction when said second arm is pivoted by said control leg in said first direction against the biasing force of said spring means during movement of said control member from the neutral position to the forward position, and for engaging said second arm so as to prevent pivotal movement of said second arm in a second direction opposite to said first direction when said first arm is pivoted by said control leg in said second direction against the biasing force of said spring means during movement of said control member from the neutral position to the reverse position.

3. A control for a hydrostatic transmission having selectable positions for controlling the flow of fluid to achieve forward, reverse and neutral positions and to govern the output speed, said control including a control member operatively connected to the transmission for selectively moving the transmission between forward, neutral and reverse positions in response to movement of said control member, a pivotally mounted bell crank including generally opposed first and second legs and a third leg intermediate said first and second legs and having an outer end portion, actuating means movably mounted for movement between forward, neutral and reverse positions, means connecting said actuating means with said first leg of said bell crank for pivoting said bell crank in response to movement of said actuating means, means connecting said control member with said second leg of said bell crank for moving said transmission between forward, neutral and reverse positions in response to pivotal movement of said bell crank, and means for urging said control member toward the neutral position including first and second arms having inner ends mounted coaxially with said bell crank for pivotal movement relative to said bell crank and having outer free ends in spaced relationship, with said outer end portion of said bell crank third leg disposed between said arms for engagement therewith, a spring interconnecting said free ends of said arms and biasing said arms toward each other, and means disposed between said arms at a location corresponding to the neutral position of said bell crank for engaging said first arm and preventing pivotal movement of said first arm in a first direction, as said second arm is pivoted with said bell crank third leg in said first direction against the biasing force of said spring during movement of said bell crank from the neutral position to the forward position, and for engaging said second arm and preventing pivotal movement of said second arm in a second direction opposite to said first direction, as said first arm is pivoted with said bell crank third leg in said second direction against the biasing force of said spring during movement of said bell crank from the neutral position to the reverse position.

4. A control according to claim 3 wherein said actuating means comprises a pedal assembly mounted for pivotal movement in opposite directions from a neutral position and means connecting said pedal assembly with said first leg of said bell crank for pivoting said bell crank in response to pivotal movement of said pedal assembly.

5. A control according to claim 4 wherein said pedal assembly includes means for releasably locking said pedal assembly in the neutral position.

6. A control according to claim 5 wherein said pedal assembly includes a foot pedal mounted for pivotal movement between a raised position and a depressed position, and wherein said releasable locking means includes a stationary latch, a latch arm on said foot pedal for lockingly engaging said latch, and biasing means for urging said foot pedal toward the raised position and for urging said latch arm into releasably locking engagement with said latch whereby, in response to said foot pedal being moved from the raised position towards the depressed position, said latch arm disengages from said latch to permit said pedal assembly to be pivoted in opposite directions relative to the neutral position and whereby, in response to release of said foot pedal when said pedal assembly is in the neutral position, said biasing means returns said foot pedal to the raised position and urges said latch arm into releasably locking engagement with said latch.

7. A control according to claim 5 wherein said means connecting said pedal assembly with said first leg of said bell crank comprises an arm on said pedal assembly movable therewith and a link pivotally connected at one end to said pedal assembly arm and pivotally connected at the other end to said first leg of said bell crank.

8. A control according to claim 3 wherein said control member comprises a lever connected to a rotary shaft operable to move the transmission between forward, reverse and neutral position and wherein said means connecting said control member with said second leg of said bell crank comprises a link pivotally connected at one end to said lever and pivotally connected at the other end to said second leg.

9. A control for a vehicle hydrostatic transmission having selectable positions for controlling the flow of fluid to achieve forward, reverse and neutral positions and to govern the speed of the vehicle, said control including a control member operatively connected to the transmission for selectively moving the transmission between forward, neutral and reverse positions in response to movement of said control member, a foot pedal mounted for pivotal movement in opposite directions between a raised neutral position and depressed forward and reverse positions, means connecting said control member to said pedal for moving the transmission between forward, neutral and reverse positions in response to pivotal movement of said pedal and means for releasably locking said pedal in the neutral position including a stationary latch, a latch arm extending from said foot pedal, having common movement with said foot pedal, and releasably engageable with said latch when said foot pedal is in the neutral position, and biasing means for urging said foot pedal toward the raised position and thereby to also releasably engage said latch arm with said latch.

* * * * *